US005493704A

United States Patent [19]

Grangeat et al.

[11] Patent Number: 5,493,704

[45] Date of Patent: Feb. 20, 1996

[54] PORTABLE COMMUNICATIONS TRANSMITTER

[75] Inventors: Christophe Grangeat, Antony; François Moisson-Franckhauser, Bretigny Sur Orge; Michel Maignan, Chilly-Mazarin, all of France

[73] Assignee: Alcatel N.V., Amsterdam, Netherlands

[21] Appl. No.: 167,213

[22] Filed: Dec. 16, 1993

[30] Foreign Application Priority Data

Dec. 17, 1992 [FR] France .................................. 92 15267

[51] Int. Cl.[6] ................................ H04B 1/38; H01Q 1/24

[52] U.S. Cl. .............................. 455/90; 455/89; 455/300; 343/841; 343/702; 361/816

[58] Field of Search ................................ 455/89, 90, 300, 455/344, 345, 346, 351; 379/428, 430, 433, 437, 440, 61, 59; 343/841, 702; 361/816; 174/35 R

[56] References Cited

U.S. PATENT DOCUMENTS

| | | | |
|---|---|---|---|
| 4,740,794 | 4/1988 | Phillips et al. | 343/702 |
| 4,980,694 | 12/1990 | Hines | 343/702 |
| 5,335,366 | 8/1994 | Daniels | 455/89 |

FOREIGN PATENT DOCUMENTS

| | | | |
|---|---|---|---|
| 0203709 | 12/1986 | European Pat. Off. . | |
| 0346125 | 12/1989 | European Pat. Off. . | |
| 0508299 | 10/1992 | European Pat. Off. . | |
| 0254630 | 2/1990 | Japan | 455/90 |

OTHER PUBLICATIONS

Patent Abstracts of Japn, vol. 8, No. 206 (E-267)(1643) Sep. 20, 1984 & JP14 A-59 92 629 (Hitachi Seisakusho).

*Primary Examiner*—Reinhard J. Eisenzopf
*Assistant Examiner*—Lee Nguyen
*Attorney, Agent, or Firm*—Sughrue, Mion, Zinn, Macpeak & Seas

[57] ABSTRACT

Protection means (6, 18) are associated with the radiating system (16) of a transmitter constituting a radiotelephone (4). The purpose of the protection means is to reduce the amount of radiation that is intercepted, i.e. the proportion of the emitted radiation (20) that is intercepted by the body of the user (2), so as to enable the overall power of the radiation to be increased. In accordance with the invention, said protection means include a casing (18) ensuring that safe distances (33, 34, 35) are maintained between the radiating system and the body of the user. The protection means further include a screen (6) that absorbs the radiation. The invention applies in particular to long-range radiotelephones.

8 Claims, 1 Drawing Sheet

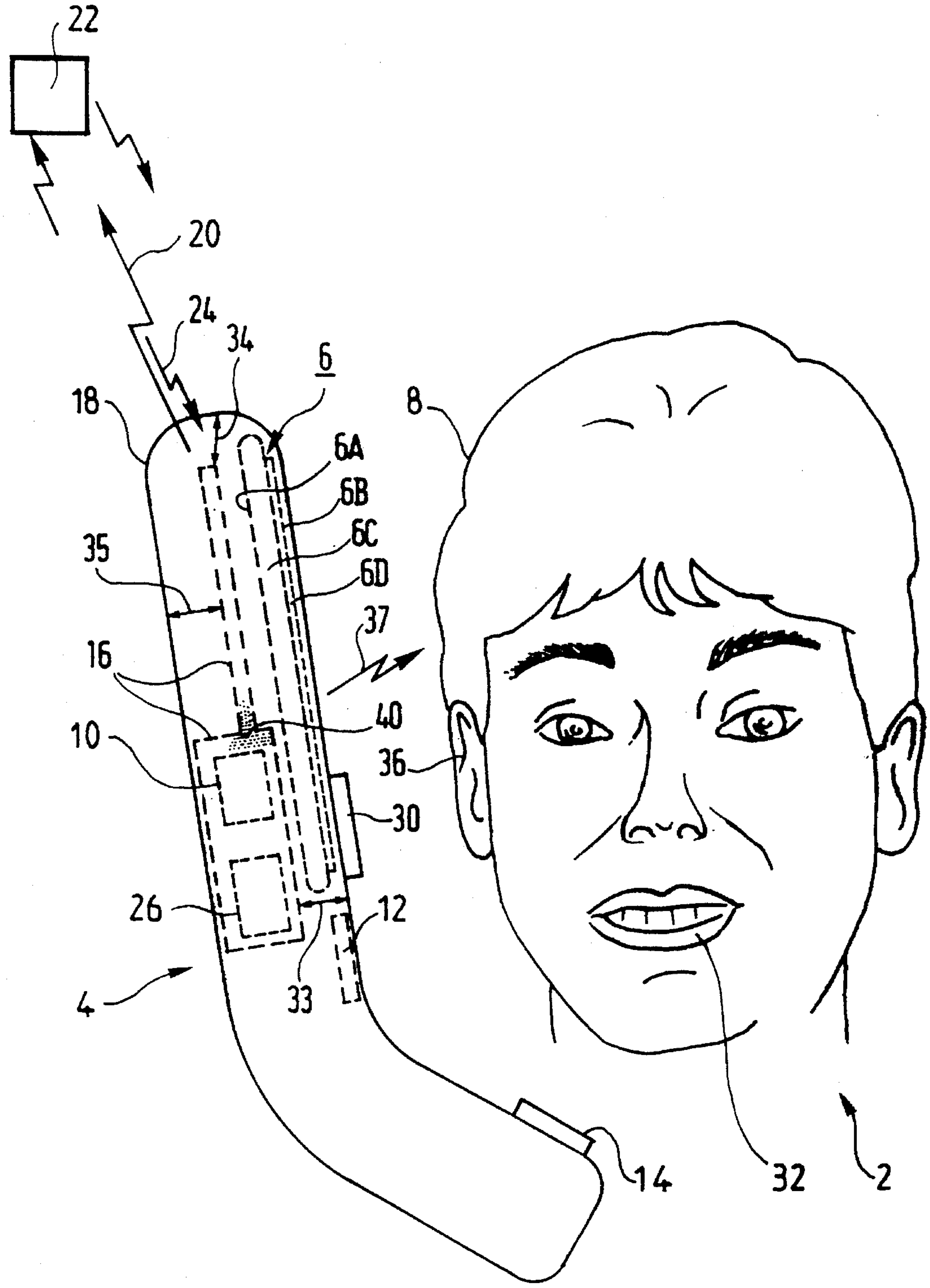
22
20
24
34
6
18
6A
6B
6C
6D
8
35
37
16
40
10
36
30
26
12
33
4
14
32
2

PORTABLE COMMUNICATIONS TRANSMITTER

BACKGROUND OF THE INVENTION

The present invention relates to portable or handheld radio transmitters, and more particularly concerns radiotelephones.

The range of such a radiotelephone is limited in particular by the power that it can radiate. Therefore, consideration has been given to making that power relatively high. Such high power could cause a potentially harmful physiological effect in the body of a user who would absorb a large fraction of radio-frequency radiation having such power. Various layouts have been proposed to limit that fraction so as to protect the user.

Documents Patent Abstracts of Japan, vol. 8, No. 206 (E-267) 1643, Sep. 20, 1984, JP-A-59 92 629 (HITACHI SEISAKUSHO) and EP-A-508 299 (SIEMENS AKTIENGESELLSCHAFT) propose raising the radiating portion of the antenna of a radiotelephone so as to move said radiating portion away from the head of the user. Such a layout increases the overall height of the radiotelephone and/or complicates the mechanical structure thereof.

SUMMARY OF THE INVENTION

Particular objects of the present invention are as follows:

- to enable long range to be given to a portable transmitter that is compact and that is simple in mechanical structure, in particular to a radiotelephone, although the invention also applies regardless of the power of the transmitter in question; and/or
- to prevent the radio-frequency radiation emitted by such a transmitter from having a physiological effect on a user using the transmitter for prolonged periods.

To this end, the present invention provides a portable radiocommunications transmitter including:

- a radiating system for emitting radiation; and
- protection means for protecting a portion of the body of a user of the transmitter against the radiation from said system;

said transmitter being characterized by the fact that the protection means include distance-maintaining means capable of maintaining safe distances in omnidirectional manner between said radiating system and a human body coming into contact with the transmitter.

An embodiment of the present invention is described below with reference to the accompanying diagrammatic figure, it being understood that the elements and layouts that are mentioned and shown are mentioned and shown only by way of non-limiting example.

BRIEF DESCRIPTION OF THE DRAWING

The single drawing FIGURE is a view showing both a radiotelephone of the invention and also a user thereof.

DESCRIPTION OF A PREFERRED EMBODIMENT

In the FIGURE, the radiotelephone is shown at 4 in a typical operating position relative to the user 2.

A general description of a transmitter of the invention is given with reference to the figure by way of example.

The transmitter 4 conventionally includes the following elements:

- a generator 10 creating electrical oscillation at a transmission frequency situated in the radio-frequency domain; the mean power of such a generator is currently typically about 0.5 watts, but the present invention enables much higher power to be considered, e.g. 20 watts;
- a modulation system 12, 14 controlling the generator; this system is disposed so that it can be controlled by the user 2; it modulates said oscillation with a data-carrying signal; and
- a radiating system 16 receiving the electrical oscillation and responding by emitting radiation 20 carrying the data. The function of this radiating system is to convert the electrical oscillation into radiation with the energy efficiency of the conversion being as high as possible. To this end, the surface of the radiating system is made so as to have good electricity-conducting properties, i.e. in practice said surface is typically made of a metal that is a good conductor. The surface of the radiating system passes currents that have various densities (that can be expressed in amps per centimeter) and various directions, so that the power density that can be expressed in watts per square centimeter of the radiation emitted from a region of the surface varies as a function of the region in question. In fact, the radiation is emitted mainly from one or more regions which are referred to below as "high-emission "regions. Such a high-emission region is shown at 40.

The transmitter further includes a screen 6 which has an inside face 6A and an outside face 6B. When the transmitter 4 is put in said operating position, the screen is disposed so that it is interposed between at least one high-emission region of the radiating system 16 and the portion of the body to be protected 8, and such that it has its inside face facing said high-emission region and its outside face facing said portion of the body.

The screen includes an absorbant structure 6C capable of converting a majority of the energy passing through it at said transmission frequency from electromagnetic radiation into heat. The absorbant structure may include a stack of different layers having respective values for electrical permittivity $\epsilon$, magnetic permeability $\mu$, and electrical resistivity $\rho$, that are chosen to provide optimum absorption of the emitted radiation. A structure of this type is known under the trademark ECCOSORB SF by the Belgian firm GRACE N.V.

The screen 6 further includes a layer 6D that has good electricity-conducting properties closer to its outside face 6B, the absorbant structure 6C being situated closer to the inside face 6A of the screen. The layer 6D is preferably a plane or curved metal strip.

In accordance with the present invention, the transmitter further includes distance-maintaining means 18 capable of maintaining a safe distance between the radiating system 16 and the body of the user 2. The distance-maintaining means are advantageously constituted by a casing 18. The distance-maintaining means maintain not only a safe distance such as 33 between the radiating system 16 and the body of the user when the transmitter 4 is in the operating position, but also a safe distance such as 34 or 35, when, for example by inadvertence, the transmitter 4 is placed in contact with the body but not in its operating position. The distance-maintaining means also maintain such a distance 34 or 35 between the radiating system 16 and the bodies of other people who might come into contact with the transmitter, the distance-maintaining means acting in cooperation with the other elements of the transmitter in omnidirectional manner.

The safe distances typically lie in the range 5 mm to 10 mm if the mean power of the transmitter is about 0.5 watts. More generally, it would appear that the safe distances need to lie in the range 3 mm to 100 mm.

As shown, when the distance-maintaining means are constituted by a casing 18, they surround the radiating system 16 and may, for reasons of making good use of the available space, also advantageously contain various elements that do not emit much radiation, in particular the screen 6, as shown. The distance-maintaining means provide less-effective absorption of said radiation than the screen 6, and preferably zero absorption so as not to weaken the emitted radiation unnecessarily when the transmitter is in the operating position.

In the absence of a screen such as 6, the protection provided by such distance-maintaining means may be sufficient in some cases.

Typically, the modulation system includes a control panel 12 for controlling emission of radiation constituting a switching signal capable of setting up a radio link between the transmitter 4 and another party 22 selected by the switching signal. The modulation system also includes a microphone 14 for modulating radiation 20 constituting a transmission signal and carrying data to said other party.

Also typically, the modulation system is implemented in the form of a radiotelephone. In which case, the modulation system includes:

a radiation sensor constituted by the radiating system 16 and capable of receiving a reception radio wave 24 transmitted by the other party 22;

a receiver 26 connected to the sensor so as to form reception signals from the reception wave; and a loudspeaker 30 for converting some of the reception signals into a sound signal.

The operating position shown for such a radiotelephone places the microphone 14 and the loudspeaker 30 in range respectively of the mouth 32 and of an ear 36 of the user 2. The head 8 of the user then constitutes the portion to be protected of the body of the user. Another operating position may place the radiotelephone in a pocket or hooked on the belt of the user.

Typically, the transmission frequency lies in the range 100 MHz to 100 GHz.

We claim:

1. A portable radiocommunications transmitter comprising:

an internal radiating system (16) for emitting radiation (20);

a modulation system, including a microphone (14), controlling an electrical oscillation generator (10) of said internal radiating system; and protection means for protecting a portion of the human body of a user of the transmitter against the radiation from said internal radiating system;

wherein said protection means comprises distance-maintaining means (18) for maintaining safe distances of at least 5 mm in an omnidirectional manner between said radiating system (16) and the human body (2) coming into contact with the transmitter (4), and wherein each of said safe distances is defined as a distance that is great enough to avoid a physiological effect by the radiation on the human body.

2. A transmitter according to claim 1, wherein said safe distances lie in the range 5 mm to 100 mm.

3. A transmitter according to claim 2, wherein said safe distances lie in the range 5 mm to 10 mm.

4. A transmitter according to claim 1, wherein said distance-maintaining means comprise a casing (18) containing said radiating system (16).

5. A transmitter according to claim 1, wherein the transmitter is a radiotelephone.

6. A transmitter according to claim 1, wherein said radiation has a frequency lying in the range 100 MHz to 100 GHz.

7. The transmitter according to claim 1, wherein said distance-maintaining means comprise a casing (18) which encloses said transmitter, and which has an outer periphery that is omnidirectionally spaced from said radiation system (16) by said safe distances.

8. The transmitter according to claim 7, wherein said casing provides substantially zero absorption of the radiation from said radiating system (16).

* * * * *